(12) United States Patent
Fukushima et al.

(10) Patent No.: US 11,938,840 B2
(45) Date of Patent: Mar. 26, 2024

(54) CONTROL METHOD FOR FUEL CELL SYSTEM, AND FUEL CELL SYSTEM

(71) Applicants: NISSAN MOTOR CO., LTD., Yokohama (JP); RENAULT s.a.s., Boulogne-Billancourt (FR)

(72) Inventors: Eisuke Fukushima, Kanagawa (JP); Hiroshi Takeda, Kanagawa (JP); Hayato Chikugo, Kanagawa (JP)

(73) Assignees: NISSAN MOTOR CO., LTD., Yokohama (JP); RENAULT s.a.s., Boulogne-Billancourt (FR)

( * ) Notice: Subject to any disclaimer, the term of this patent is extended or adjusted under 35 U.S.C. 154(b) by 43 days.

(21) Appl. No.: 17/765,980

(22) PCT Filed: Oct. 4, 2019

(86) PCT No.: PCT/IB2019/001155
§ 371 (c)(1),
(2) Date: Apr. 1, 2022

(87) PCT Pub. No.: WO2021/064438
PCT Pub. Date: Apr. 8, 2021

(65) Prior Publication Data
US 2022/0340047 A1  Oct. 27, 2022

(51) Int. Cl.
*H01M 8/04303* (2016.01)
*B60L 58/34* (2019.01)
*H01M 8/0432* (2016.01)
*H01M 8/04701* (2016.01)

(52) U.S. Cl.
CPC ......... *B60L 58/34* (2019.02); *H01M 8/04303* (2016.02); *H01M 8/0432* (2013.01); *H01M 8/04701* (2013.01); *H01M 2250/20* (2013.01)

(58) Field of Classification Search
CPC .......... B60L 50/75; B60L 53/64; B60L 58/31; B60L 58/34; B60L 58/40; H01M 2250/20; H01M 8/04303; H01M 8/0432; H01M 8/04701
See application file for complete search history.

(56) References Cited

U.S. PATENT DOCUMENTS 6,158,537 A    12/2000   Nonobe

FOREIGN PATENT DOCUMENTS

JP            10-40931 A     2/1998

*Primary Examiner* — Victoria H Lynch
(74) *Attorney, Agent, or Firm* — Foley & Lardner LLP

(57) ABSTRACT

A control method includes acquiring the operation stop request of the fuel cell system, acquiring a next vehicle operation start timing, and calculating a first energy cost and a second energy cost at a predetermined timing after acquiring the operation stop request and the next vehicle operation start timing. The first energy cost is an energy cost required from the predetermined timing to completion of warming up of the fuel cell when a warm-up control is executed using the heater in accordance with the next vehicle operation start timing after the stop control is executed. The second energy cost is an energy cost required when an operation of the fuel cell is continued so as to maintain a temperature of the fuel cell at a warm-up temperature from the predetermined timing to the next vehicle operation start timing. The control method includes continuing the operation of the fuel cell such that the temperature of the fuel cell is maintained at the warm-up temperature while the first energy cost is larger than the second energy cost after the operation stop request is acquired.

8 Claims, 11 Drawing Sheets

CONTROL METHOD FOR FUEL CELL SYSTEM, AND FUEL CELL SYSTEM

TECHNICAL FIELD

The present invention relates to a control method for a fuel cell system, and a fuel cell system.

BACKGROUND ART

JP H10-40931A discloses a power supply system for an electric vehicle, and the power supply system is capable of driving an electric motor based on electricity of at least one of a fuel cell and a secondary battery. In this power supply system, when the system is stopped, the secondary battery is charged by the fuel cell during a period before a remaining capacity of the secondary battery reaches a predetermined quantity, and the system is stopped after the charging is completed.

SUMMARY OF INVENTION

In the system described above, when the system is stopped, it is determined whether the electricity generation of the fuel cell is continued by considering only the remaining capacity of the secondary battery, and execution of a system stop control does not consider an energy cost associated with the electricity generation of the fuel cell, an energy cost from a stop to a restart of the system, and the like. Therefore, depending on a timing from the system stop control to the restart, a waste may occur from the viewpoint of the energy costs.

Therefore, an object of the present invention is to provide a technique for realizing a system control, which can reduce energy costs as much as possible in consideration of an energy cost from a system stop to a next vehicle operation start and an energy cost associated with electricity generation of a fuel cell when a system stop request is received.

According to one aspect of the present invention, a control method for a fuel cell system for a vehicle is provided, the fuel cell system including a fuel cell, and a heater configured to warm up the fuel cell, and capable of executing a stop control when an operation stop request of the fuel cell system is received. The control method includes acquiring the operation stop request of the fuel cell system, acquiring a next vehicle operation start timing, and calculating a first energy cost and a second energy cost at a predetermined timing after acquiring the operation stop request and the next vehicle operation start timing. The first energy cost is an energy cost required from the predetermined timing to completion of warming up of the fuel cell when a warm-up control is executed using the heater in accordance with the next vehicle operation start timing after the stop control is executed. The second energy cost is an energy cost required when an operation of the fuel cell is continued so as to maintain a temperature of the fuel cell at a warm-up temperature from the predetermined timing to the next vehicle operation start timing. The control method also includes continuing the operation of the fuel cell such that the temperature of the fuel cell is maintained at the warm-up temperature while the first energy cost is larger than the second energy cost after the operation stop request is acquired.

DESCRIPTION OF EMBODIMENTS

First Embodiment

Hereinafter, embodiments of the present invention are described with reference to the drawings.

Figure 1:
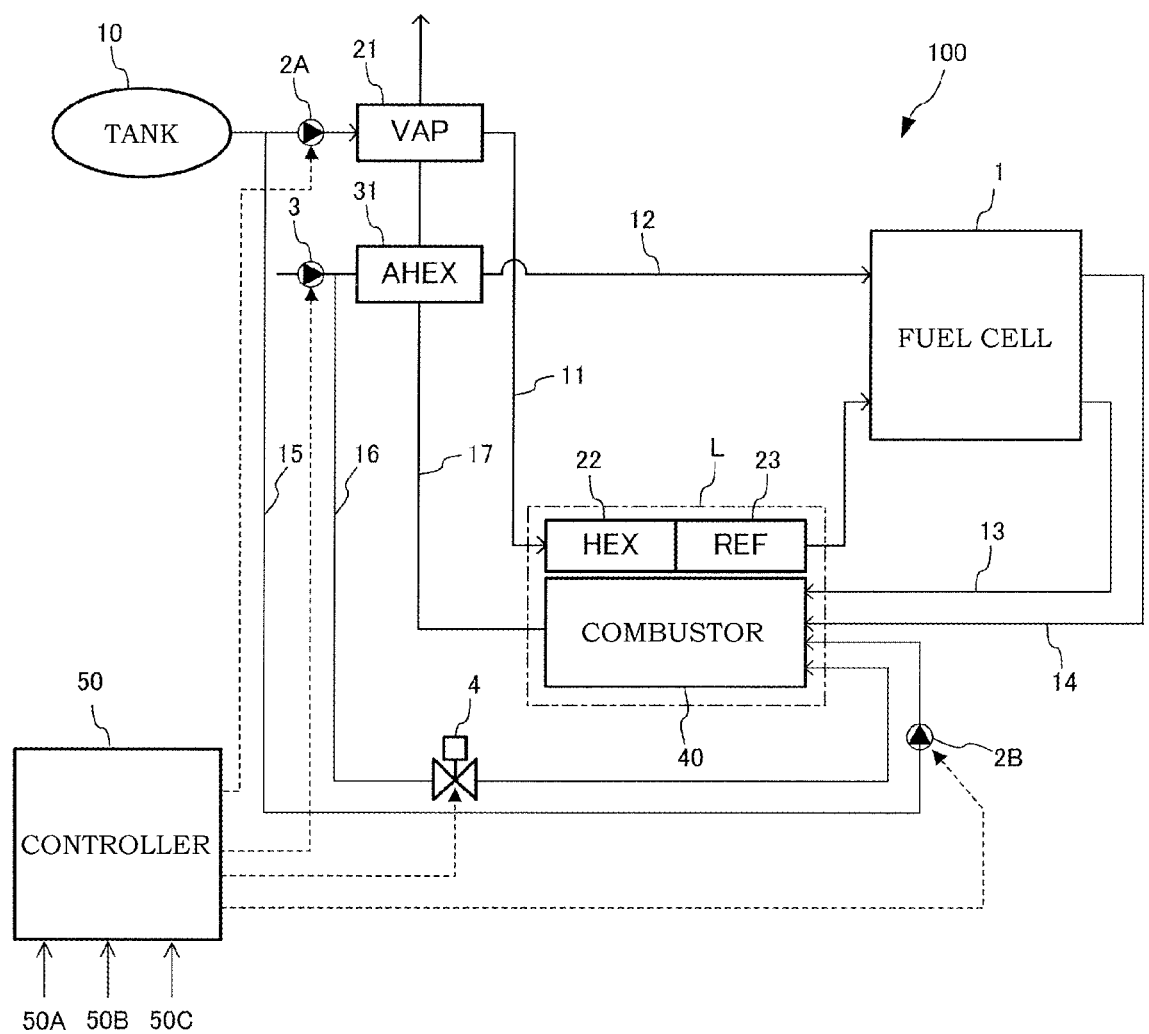
FIG. 1 is a schematic configuration diagram of a fuel cell system according to a first embodiment.

FIG. 1 is a schematic configuration diagram of a fuel cell system 100 according to a first embodiment of the present invention.

The fuel cell system 100 shown in FIG. 1 is, for example, a system mounted on a series hybrid vehicle. The fuel cell system 100 includes a fuel cell stack 1 as a solid oxide fuel cell (SOFC), a fuel tank 10 that stores a liquid fuel used for electricity generation of the fuel cell stack 1, a controller 50 that integrally controls the fuel cell system 100, and the like.

The fuel cell stack 1 is a fuel cell laminate that generates electricity by receiving an anode gas and a cathode gas. The generated electricity of the fuel cell stack 1 is used to charge a battery (see FIG. 2) mounted on the hybrid vehicle. The fuel cell stack 1 is configured by laminating a plurality of fuel cells, and each fuel cell as an electricity generation source is, for example, a solid oxide fuel cell.

The fuel tank 10 stores the liquid fuel necessary for generating the anode gas to be supplied to the fuel cell stack 1 or generating a combustion gas used for warming up system components and the like. The liquid fuel is, for example, a fuel consisting of water and ethanol (for example, hydrous ethanol containing 40% by volume of ethanol). The liquid fuel is not limited to hydrous ethanol, and may be a liquid fuel containing gasoline, methanol, or the like.

The fuel cell stack 1 and the fuel tank 10 are connected to each other through an anode gas passage 11. The anode gas passage 11 is provided with an evaporator 21, a fuel heat exchanger 22, and a reformer 23 in the order from an upstream side in a flow direction. The evaporator 21, the fuel heat exchanger 22, and the reformer 23 are auxiliary machines necessary for supplying the anode gas to the fuel cell stack 1.

On an upstream side of the evaporator 21, a fuel supply path 15 branches from the anode gas passage 11, and the fuel supply path 15 connects the anode gas passage 11 and a catalyst combustor 40.

A first injector 2A is provided on the anode gas passage 11 between a branch point of the fuel supply path 15 and the evaporator 21, and a second injector 2B is provided on the fuel supply path 15. The first injector 2A is configured to operate in response to a command signal from the controller 50 to supply the liquid fuel by injection to the evaporator 21. Further, the second injector 2B is configured to operate in response to a command signal from the controller 50 to supply the liquid fuel by injection to the catalyst combustor 40.

The evaporator 21 heats the liquid fuel supplied from the first injector 2A to generate a vaporized fuel. The evaporator 21 heats the liquid fuel by heat exchange with a high-temperature combustion gas supplied from the catalyst combustor 40 through a combustion gas passage 17.

The fuel heat exchanger 22 receives the heat of the combustion gas generated by the combustion in the catalyst combustor 40 and further heats the vaporized fuel.

The reformer 23 has a built-in reforming catalyst, and reforms the vaporized fuel supplied from the fuel heat exchanger 22 to generate an anode gas containing hydrogen, carbon monoxide, or the like. The anode gas generated by the reformer 23 is supplied to the fuel cell stack 1.

Meanwhile, the fuel cell system 100 includes a cathode gas passage 12 for supplying air (cathode gas) to the fuel cell stack 1. The cathode gas passage 12 is provided with an air heat exchanger 31.

The air heat exchanger 31 heats the cathode gas flowing through the cathode gas passage 12 by heat exchange with the combustion gas supplied from the catalyst combustor 40 through the combustion gas passage 17. In the present embodiment, an air compressor 3 is disposed near an open end of the cathode gas passage 12, and air as the cathode gas is suctioned into the cathode gas passage 12 through the air compressor 3. The cathode gas is heated when passing through the air heat exchanger 31, and is supplied to the fuel cell stack 1. The air heat exchanger 31 is an auxiliary machine necessary for the fuel cell stack 1 to generate electricity. As a device for suctioning air, a blower may be used instead of the air compressor 3.

An air supply path 16 branches from the cathode gas passage 12 between the air compressor 3 and the air heat exchanger 31, and the air supply path 16 connects the cathode gas passage 12 and the catalyst combustor 40. A flow rate control valve 4 for adjusting a flow rate of the air supplied to the catalyst combustor 40 is disposed in the air supply path 16.

The catalyst combustor 40 has a built-in combustion catalyst containing platinum (Pt), palladium (Pd), or the like. The catalyst combustor 40 generates a combustion gas by combusting the liquid fuel and the air supplied through the fuel supply path 15 and the air supply path 16.

In the fuel cell system 100, the catalyst combustor 40 is connected to the air heat exchanger 31 and the evaporator 21 via the combustion gas passage 17, and heats the air heat exchanger 31 and the evaporator 21 by the heat of the combustion gas. Meanwhile, the fuel heat exchanger 22 and the reformer 23 are housed in a case shared with the catalyst combustor 40 (one-dot chain line L in FIG. 1), and inside the case L, the heat of the catalyst combustor 40 is transferred to the fuel heat exchanger 22 and the reformer 23.

Further, in the fuel cell system 100, the fuel cell stack 1 and the catalyst combustor 40 are connected by an anode off-gas passage 13 and a cathode off-gas passage 14. The catalyst combustor 40 generates a combustion gas by catalytically combusting an anode off-gas and a cathode off-gas discharged from the fuel cell stack 1. The combustion gas generated by the catalyst combustor 40 is discharged to the outside through the combustion gas passage 17.

The controller 50 is an electronic control unit implemented by a microcomputer provided with a central processing unit (CPU), various storage devices such as ROM and RAM, and an input and output interface and the like, and executes various pre-programmed controls. The controller 50 is programmed to control operations of the first injector 2A, the second injector 2B, the air compressor 3, and the flow rate control valve 4, for example, according to a traveling state of the vehicle and an operating state of the fuel cell system 100.

The controller 50 detects the operating state of the fuel cell system 100 or the like by acquiring detection signals from various sensors or the like. The fuel cell system 100 includes, as various sensors, a temperature sensor 50A that detects a temperature of the fuel cell stack 1, a timer 50B that outputs a current time, a start switch 50C for instructing the start and stop of the vehicle, and the like.

Next, an electricity system of the fuel cell system 100 is described with reference to FIG. 2.

Figure 2:
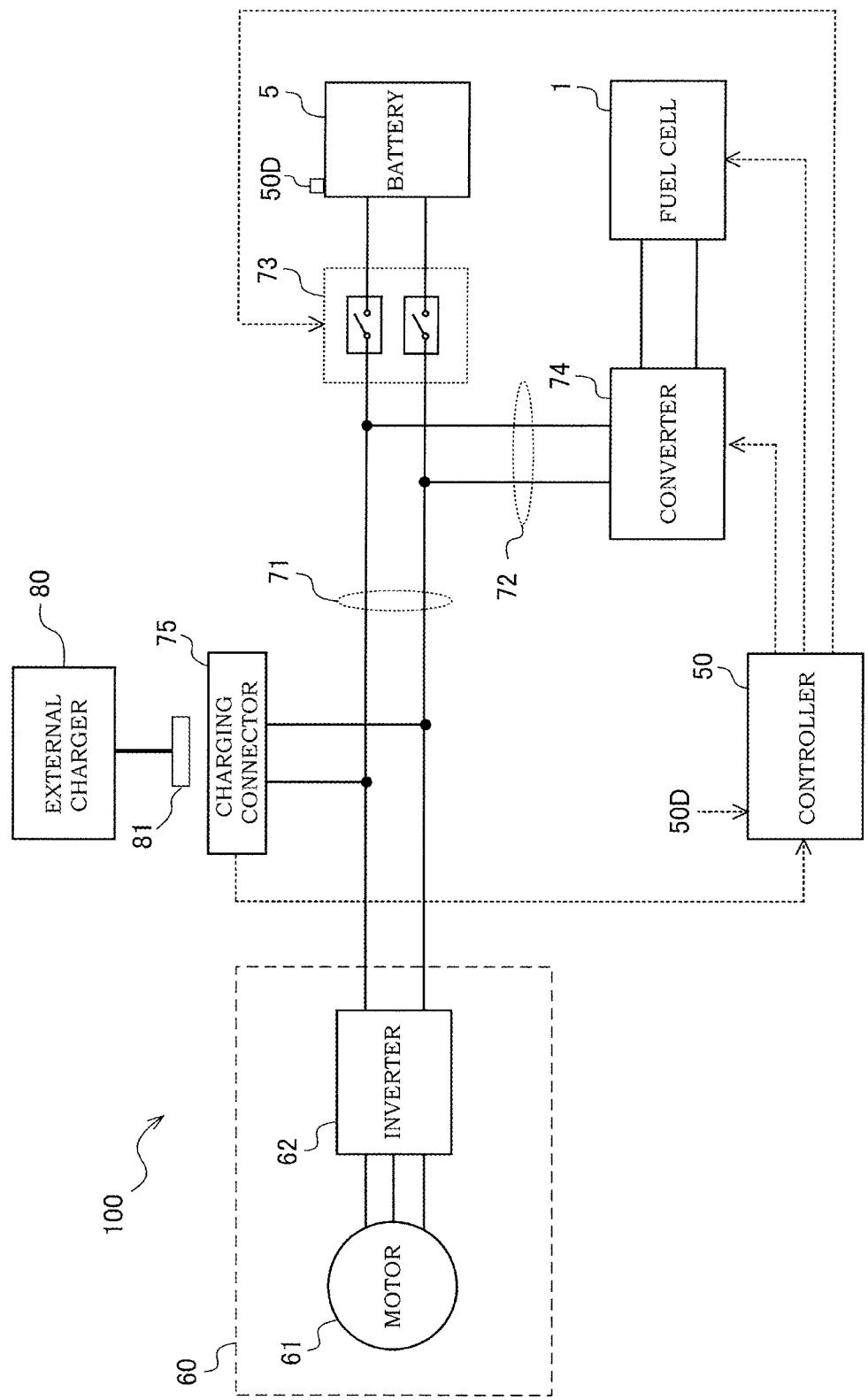
FIG. 2 is a diagram schematically illustrating an electricity system of the fuel cell system according to the first embodiment.

The fuel cell system 100 is mounted on the series hybrid vehicle, and the fuel cell stack 1 is electrically connected to a battery 5 of the vehicle as shown in FIG. 2. In the fuel cell system 100, the electricity generated by the fuel cell stack 1 is basically charged to the battery 5, but the battery 5 may also be charged by using electricity from an external charger 80. The external charger 80 is a quick charging device disposed in a facility such as a charging stand, or a household power supply having smaller output electricity than the quick charging device.

As shown in FIG. 2, the electricity system of the fuel cell system 100 includes the battery 5 as a vehicle power supply, a drive device 60 as a vehicle driving source, a first wiring 71 provided between the drive device 60 and the battery 5, a second wiring 72 connecting the first wiring 71 and the fuel cell stack 1, a relay 73 provided on the first wiring 71, a converter 74 provided on the second wiring, and a charging connector 75 configured to be connected to the external charger 80. Various devices constituting the electricity system are also controlled by the controller 50 described above.

The drive device 60 is a load connected to the battery 5 and the fuel cell stack 1, and drives the vehicle by receiving electricity of at least one of the battery 5 and the fuel cell stack 1. The drive device 60 includes an electric motor 61 as a drive source, and an inverter 62 that converts DC electricity of at least one of the battery 5 and the fuel cell 1 into AC electricity to be supplied to the electric motor 61.

The first wiring 71 is a power supply line that connects the battery 5 and the inverter 62. The battery 5 is a power supply for supplying electricity to the drive device 60, and is a lithium ion battery, a lead battery, or the like. The battery 5 is provided with a voltage sensor 50D for detecting an output voltage of the battery 5, and a detection signal of the voltage sensor 50D is output to the controller 50.

The relay 73 is disposed on the first wiring 71, and the relay 73 is a breaker that switches a state between the battery 5 and the drive device 60 to a connected state or a disconnected state. The relay 73 is also a breaker capable of switching a state between the converter 74 and the battery 5 in the first wiring 71 from a connected state to a disconnected state.

The second wiring 72 is a power supply line that branches from the first wiring 71 and is connected to the fuel cell stack 1. The second wiring 72 is provided with the converter 74.

The converter 74 is a DC/DC converter, which is an electricity converter that converts a voltage (primary voltage) of the fuel cell stack 1 such that an output voltage (secondary voltage) to the first wiring 71 is a predetermined voltage at which electricity of the fuel cell stack 1 can be output. The converter 74 transmits the electricity of the fuel cell stack 1 to the battery 5 and the drive device 60 via the first wiring 71.

The first wiring 71 is provided with a charging connector 75 capable of being connected to a charging gun 81 disposed in the external charger 80. The charging connector 75 is an electric connection device, which is disposed in a charging port provided on a vehicle body, and receives electricity from the charging gun 81 when charging by the external charger 80. By connecting a tip end portion of the charging gun 81 to the charging connector 75, the electricity can be supplied from the external charger 80 to the battery 5. The charging connector 75 is provided with a connection state detection sensor that detects whether the tip end portion of the charging gun 81 is connected, a current sensor that detects a current flowing from the charging connector 75 to the battery 5, or the like. The controller 50 determines whether the battery 5 is charged by the external charger 80 based on detection signals of these sensors.

Operations of various devices such as the relay 73, the inverter 62, and the converter 74 that constitute the electricity system of the fuel cell system 100 is controlled by the controller 50.

In the fuel cell system 100 as described above, a warm-up control that warms up the fuel cell stack 1 is executed at the time of starting the system, and a system stop control is executed when a system stop request is received.

For example, in the fuel cell system 100 shown in FIG. 1, when it is necessary to warm up the fuel cell stack 1 at the time of starting the system, the second injector 2B supplies the liquid fuel to the catalyst combustor 40, and the air compressor 3 is operated to open the flow rate control valve 4 to supply the air to the catalyst combustor 40. Thus, the fuel heat exchanger 22 and the like can be heated by the combustion gas generated by the combustion of the liquid fuel. As a result, the anode gas and the cathode gas that are heated by these heat exchangers are supplied to the fuel cell stack 1, and the fuel cell stack 1 is warmed up. In this way, the catalyst combustor 40 functions as a heater for warming up the fuel cell stack 1.

Here, the term "at the time of starting the system" refers to a period during which a process (warm-up operation for starting the fuel cell system 100) of increasing temperatures of elements in the fuel cell system 100 such as the fuel cell stack 1 to desired temperatures suitable for respective operations is executed triggered by detection of a system start command from the controller 50, in a state where an operation of the fuel cell system 100 is stopped (a state where an operation of each element in the fuel cell system 100 including the fuel cell stack 1 is stopped).

Further, in the fuel cell system 100, the stop control is executed in response to a system stop request or the like based on a key-off operation of a driver. In the fuel cell system 100, since an operation temperature of the fuel cell stack 1 is high, cooling processing of the fuel cell stack 1 is executed before the operation of each element of the fuel cell system 100 is completely stopped in the stop control. In the cooling processing of the stop control, the air compressor 3 is driven to continue supplying the cathode gas, and the fuel cell stack 1 is cooled by the cathode gas. At this time, the first injector 2A is also controlled to supply a small quantity of fuel, and a small quantity of anode gas is supplied to the fuel cell stack 1. In this way, by supplying the anode gas to the fuel cell stack 1, the cathode gas (air) can be prevented from flowing back from the catalyst combustor 40 into the fuel cell stack 1, and oxidative deterioration of an anode electrode of the fuel cell stack 1 can be prevented. Such a stop control starts from a timing when the system stop request is received (stop request acquisition timing), and ends when, for example, the temperature of the fuel cell stack 1 reaches a temperature at which the oxidative deterioration of the anode electrode can be suppressed or prevented.

In the fuel cell system 100, the stop control and the warm-up control are generally executed as described above. Once the system is stopped, it is necessary to warm up the fuel cell stack 1 to the operation temperature before a next vehicle operation starts. The solid oxide fuel cell stack 1 used in the fuel cell system 100 has a high operation temperature of about 700° C., and consumes a large quantity of liquid fuel when the warm-up control is executed. In particular, when the fuel cell system 100 is configured to combust the fuel in the catalyst combustor 40 to warm up the fuel cell stack 1, the fuel combusted here is not used for electricity generation, but is mainly used for heating the fuel cell stack 1 and the like.

Therefore, when the fuel cell system 100 is stopped and then restarted, depending on a timing at which the next vehicle operation starts, a case of maintaining the temperature of the fuel cell stack 1 by continuing the operation (electricity generation) of the fuel cell stack 1 even when the system stop request is issued may be able to reduce the loss of energy costs as compared with a case of executing the stop control immediately when the stop request is issued and then executing the warm-up control.

Figure 3:
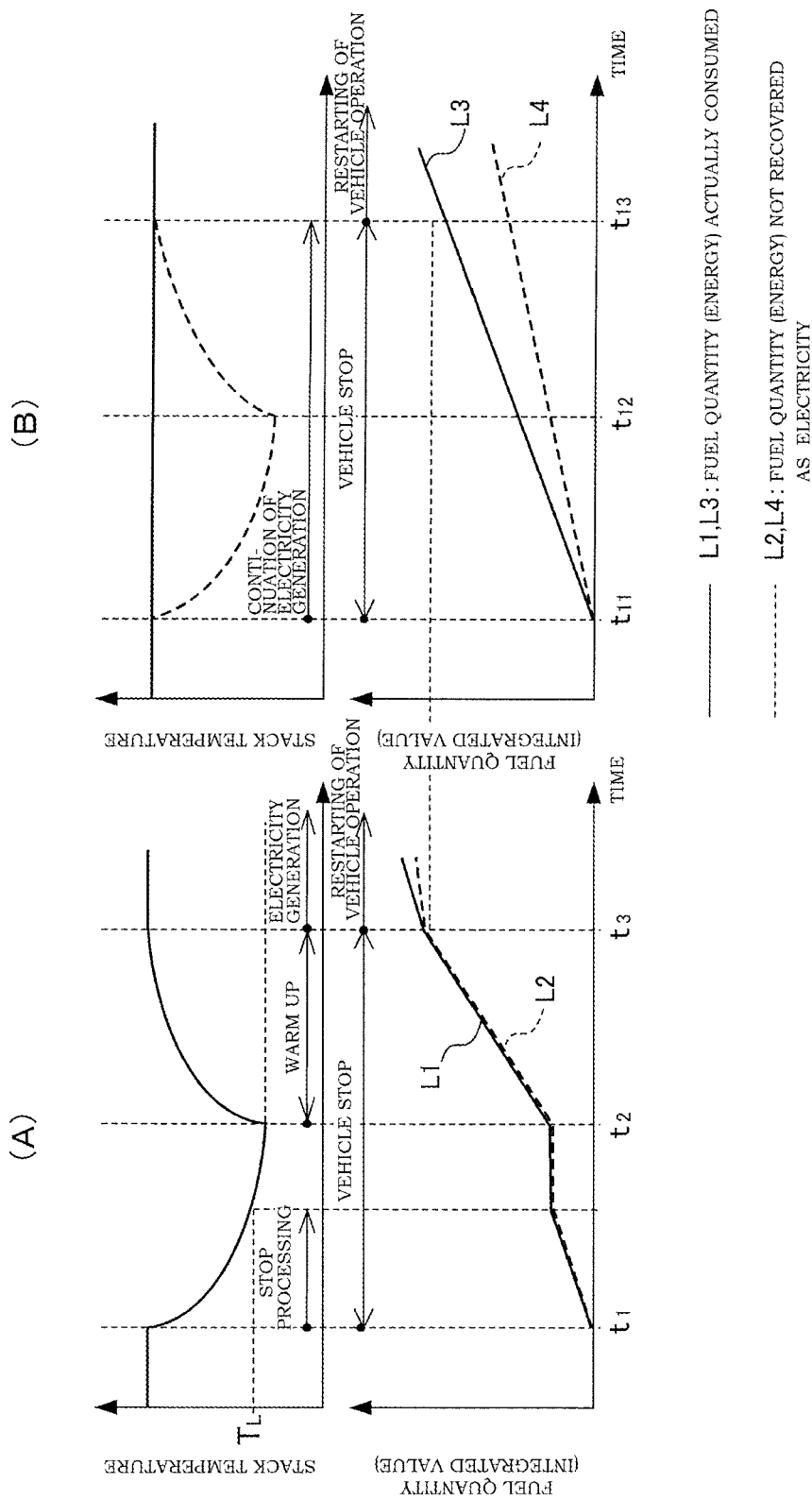
FIG. 3 is a diagram illustrating a control method when a system stop request is issued and a change in a fuel quantity consumed at that time.

FIG. 3 is a diagram illustrating a control method when the system stop request is issued and a change in a fuel quantity consumed at that time. Lines L1 to L4 in FIGS. 3(A) to 3(B) show a time change of an integrated value of the fuel quantity.

As shown in FIG. 3(A), for example, when the stop control is executed immediately at a time point (time $t_1$) at which a start switch 50C of the vehicle is operated and a system stop request is output, the supply of the cathode gas and the anode gas to the fuel cell stack 1 is continued during a period before a stack temperature decreases to a predetermined temperature TL. Thereafter, when a system restart request is issued at a time t2, the warm-up control is started, and the fuel cell stack 1 is warmed up using the combustion heat of the fuel supplied to the catalyst combustor 40. In the stop control, the fuel is not used for electricity generation, and thus almost all of the consumed fuel is a fuel that is not recovered as generated electricity, and also in the warm-up control, the fuel is used as a heat source for warming up, and thus most of the consumed fuel is not recovered as generated electricity. In this way, when the fuel cell system 100 is stopped and restarted, as shown in the line L1 of FIG. 3(A), a large quantity of fuel is consumed, and as shown in the line L2, most of the fuel does not contribute to the generated electricity.

On the other hand, when a time from when the system stop request is issued to when the system is restarted is relatively short or the like, as shown in FIG. 3(B), continuing electricity generation to the extent that the temperature of the fuel cell stack 1 is maintained even if the system stop request is issued at a time t11 may be more efficient from the viewpoint of overall energy cost. That is, during a period from when the stop request is issued to when a next vehicle operation is started (from the time t11 to a time t13), the fuel is supplied to the fuel cell stack 1, and the electricity generation is continued to the extent that the temperature of the fuel cell stack 1 is maintained, and thus the fuel cell stack 1 can be normally operated at the same time as a vehicle operation start timing. A fuel quantity (line L3) consumed at the timing t13 when a normal operation can be started is less than a fuel quantity (line L1) consumed during a period from when the stop request is issued to when the warming up is completed (from the time t1 to a time t3) in FIG. 3(A). In this way, depending on a timing of restarting the fuel cell system 100, electricity generation is continued during a period before the vehicle operation is restarted, and thus it can be said that a fuel quantity that is not recovered as generated electricity can be reduced, and the energy generated from the fuel is efficiently used for electricity generation.

Therefore, in the fuel cell system 100 according to the present embodiment, when a system stop request is detected, the continuation of electricity generation or the stop control is executed so as to reduce the energy loss as much as possible, considering the energy cost in the case of stopping and restarting the system, the energy cost in the case of continuing the electricity generation with the fuel cell stack 1, and the like.

Figure 4:
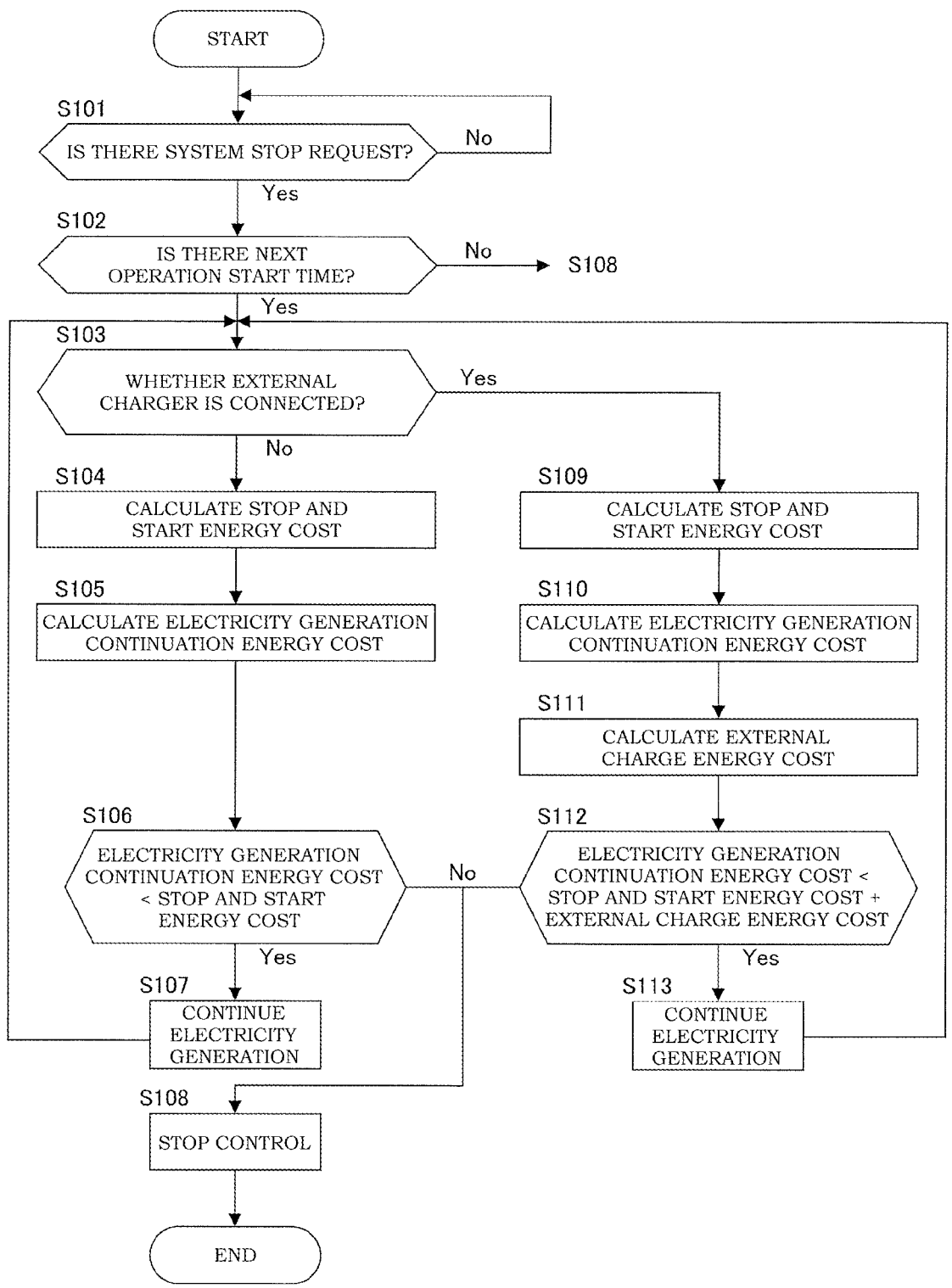
FIG. 4 is a flowchart illustrating a flow of processing executed when the system stop request is issued in the fuel cell system according to the first embodiment.

Hereinafter, the processing executed by the fuel cell system 100 when a system stop request is detected is described with reference to FIG. 4. FIG. 4 is a flowchart illustrating a flow of the processing executed when the system stop request is issued. The controller 50 of the fuel cell system 100 is programmed to perform the processing in FIG. 4.

As shown in FIG. 4, in step S101, the controller 50 determines whether a system stop request is issued. The vehicle is configured to output a stop request for the fuel cell system 100 in order to stop the vehicle when the start switch 50C is operated by a driver or the like. When a system stop request based on the operation of the start switch 50C is detected (acquired), the controller 50 determines that a system stop request is issued, and then executes processing of step S102. On the other hand, the controller 50 repeatedly executes the processing of step S101 when no system stop request is issued while no system stop request is detected.

In step S102, the controller 50 determines whether a next operation start time (next vehicle operation start timing) is set and registered. The vehicle equipped with the fuel cell system 100 according to the present embodiment is a vehicle capable of storing a vehicle operation plan and the like of a driver in a ROM or the like of the controller 50, and is configured such that a driver or the like can set and register date and time when the vehicle is to be used next or the like via a car navigation device or a smartphone owned by the driver. Further, when the vehicle is a vehicle used for car sharing, a next vehicle operation start timing may be set based on a use status of car sharing. This next operation start time means a timing at which a vehicle operation can be restarted after the fuel cell system 100 is warmed up.

When a next vehicle operation start timing is acquired in step S102, the controller 50 executes processing of step S103. On the other hand, when no next vehicle operation start timing is set and registered, and the time cannot be acquired, the controller 50 executes processing of step S108, starts a stop control without considering various energy costs, and ends the operation of the fuel cell system 100 after decreasing the temperature of the fuel cell stack 1 to a predetermined temperature.

In step S103, the controller 50 determines whether the fuel cell system 100 is connected to the external charger 80. This determination is performed, for example, based on an output signal of the connection state detection sensor that detects whether the charging gun 81 of the external charger 80 is connected to the charging connector 75. When the external charger 80 is not connected, the controller 50 executes processing of step S104 and subsequent steps. On the other hand, when the external charger 80 is connected, the controller 50 determines that the battery 5 needs to be charged to a target charge quantity when the system is stopped, and executes processing of step S109 and subsequent steps.

When the external charger 80 is not connected, the controller 50 calculates, in step S104, an energy cost (hereinafter, referred to as a "stop and start energy cost") when the stop and start is executed. The stop and start energy cost calculated in step S104 is an energy cost (first energy cost) required from a current time (cost calculation timing) to completion of warming up of the fuel cell stack 1 when a warm-up control is executed using the catalyst combustor 40 in accordance with a next vehicle operation start timing after a stop control for stopping the fuel cell system 100 is executed. This stop and start energy cost is calculated, for example, as shown in FIG. 5A.

Figure 5A:
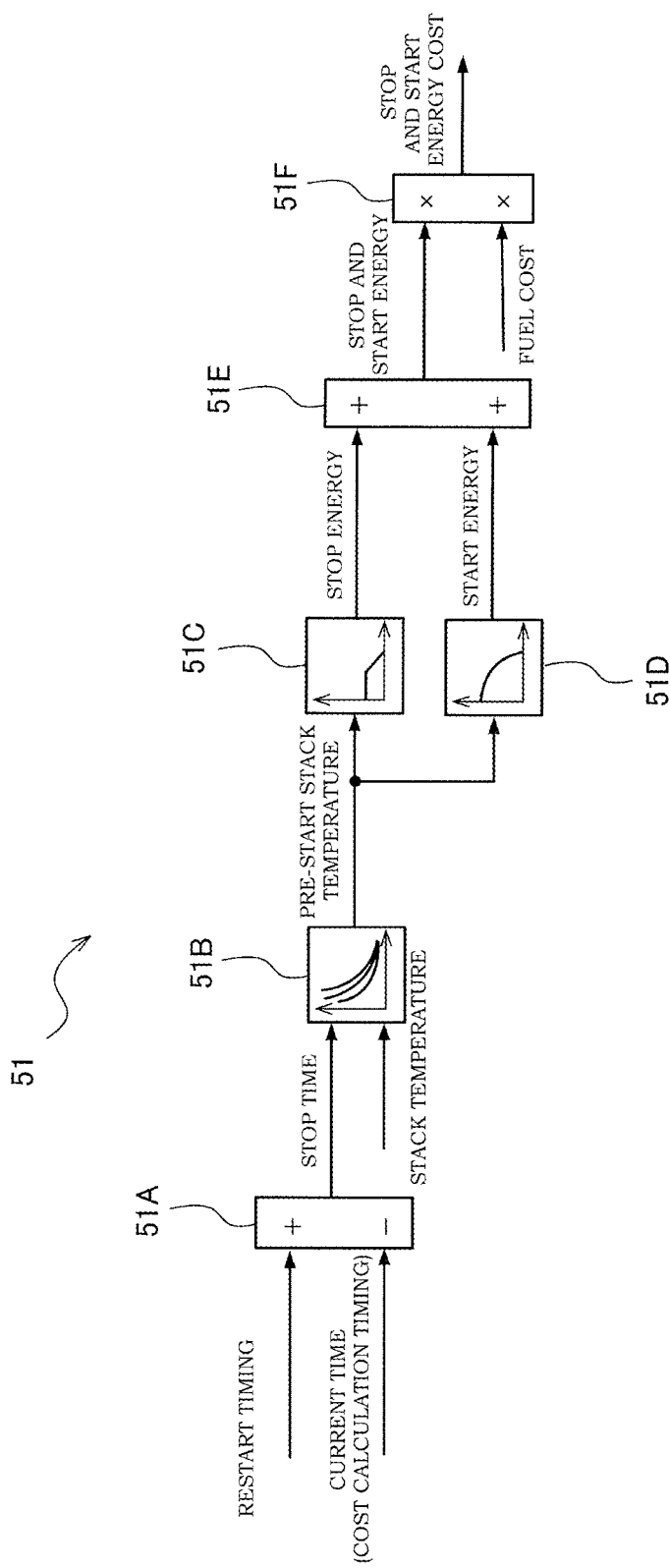
FIG. 5A is a diagram illustrating a stop and start energy cost calculation unit of a controller.

FIG. 5A is a diagram illustrating a stop and start energy cost calculation unit 51 of the controller 50. As shown in FIG. 5A, the stop and start energy cost calculation unit 51 includes a stop time calculation unit 51A, a pre-start stack temperature calculation unit 51B, a stop energy calculation unit 51C, a start energy calculation unit 51D, an addition unit 51E, and a cost calculation unit 51F.

The stop time calculation unit 51A calculates a stop time, during which the vehicle and the fuel cell system 100 is in a stopped state, by subtracting a current time (current cost calculation timing) from a restart timing of the fuel cell stack 1 obtained based on a next vehicle operation start timing. The current cost calculation timing is a time from acquisition of a stop request of the fuel cell system 100 to a current time, and is also an electricity generation duration time of the fuel cell stack 1 from a system stop request timing.

Figure 5B:
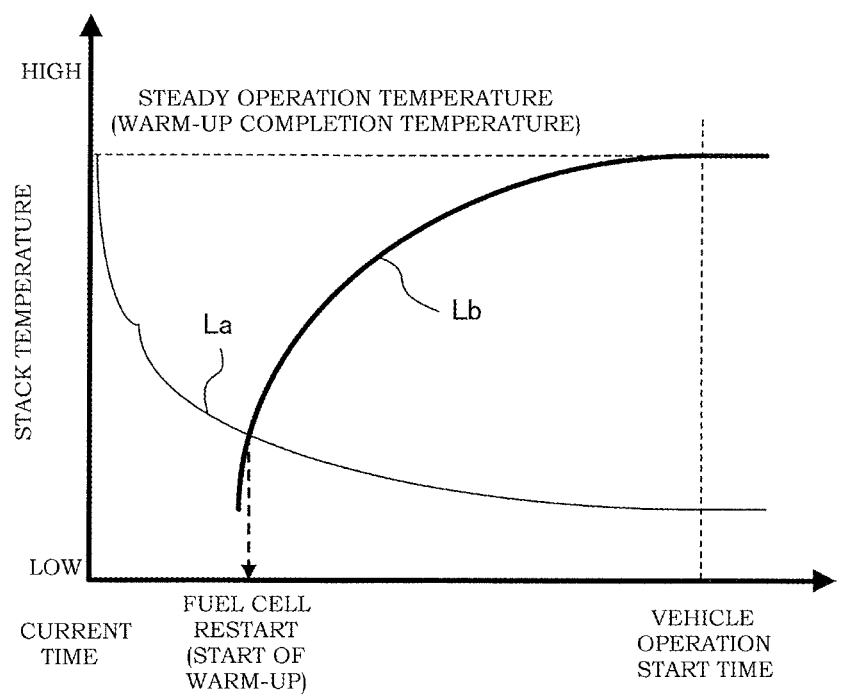
FIG. 5B is a diagram illustrating a calculation example of a restart timing of the fuel cell system.

The restart timing of the fuel cell stack 1 is calculated as shown in FIG. 5B based on the next vehicle operation start timing acquired in step S102. As shown in FIG. 5B, the controller 50 acquires a current stack temperature, and calculates, based on the stack temperature, a temperature decrease characteristic line La when the stop control is executed. This characteristic line La may be stored in advance as map data for each current stack temperature, or may be acquired from a heat dissipation simulation obtained based on a heat dissipation quantity of the fuel cell stack 1. The controller 50 calculates the restart timing of the fuel cell stack 1, at which the warming up of the fuel cell stack 1 is completed when a vehicle operation starts, based on the temperature decrease characteristic line La, a stack temperature-warm-up time characteristic line Lb, and the acquired next vehicle operation start timing. That is, the controller 50 sets, as the restart timing (warm-up start timing) of the fuel cell stack 1, an intersection of the decrease characteristic line La, which indicates the decrease in the stack temperature from the current time, and the stack temperature-warm-up time characteristic line Lb, which indicates that the warm-up temperature is reached when a next vehicle operation starts. The stack temperature-warm-up time characteristic line Lb is data obtained by conducting experiments in advance about a relationship between a time for performing the warm-up control and a degree of increase in the stack temperature.

This characteristic line Lb may be obtained from a temperature increase simulation obtained based on a stack heat capacity and a heat quantity that can be supplied to the fuel cell stack 1.

As shown in FIG. 5A, after the stop time calculation unit 51A calculates a stop time, the pre-start stack temperature calculation unit 51B calculates a stack temperature (pre-start stack temperature) at the restart timing (warm-up start timing) of the fuel cell system 100 based on the stop time and the current stack temperature. The current stack temperature may be one acquired by the temperature sensor 50A provided on the fuel cell stack 1, or may be estimated based on a temperature of an off-gas discharged from the fuel cell stack 1. As shown in FIG. 5A, a characteristic line showing a relationship between the stop time and the pre-start stack temperature has a characteristic that as the stop time increases, the pre-start stack temperature decreases. Further, this characteristic line is set for each predetermined stack temperature.

The stop energy calculation unit 51C calculates a stop energy based on the pre-start stack temperature. This stop energy is an energy (fuel quantity or the like) required when the stop control is executed in the fuel cell system 100 and the system 100 is in a stopped state until the restart timing. As the pre-start stack temperature decreases, the stop energy is calculated to be smaller. Further, this stop energy is calculated so as to be a constant value at a temperature equal to or lower than the predetermined temperature. This is because when the temperature of the fuel cell stack 1 is equal to or lower than the predetermined temperature, cooling by a gas or the like is not performed, and a state of natural cooling is realized, and therefore the energy such as the fuel is not consumed.

The start energy calculation unit 51D calculates a start energy based on the pre-start stack temperature. This start energy is an energy (fuel quantity or the like) required from the restart timing to the completion of the warming up of the fuel cell stack 1 after the warm-up control is started. As the pre-start stack temperature decreases, the start energy increases.

The addition unit 51E adds the stop energy and the start energy to calculate a stop and start energy. The stop and start energy calculated in this way is input to the cost calculation unit 51F. The cost calculation unit 51F calculates a stop and start energy cost by integrating a cost per unit energy with respect to the stop and start energy. The cost per unit energy is, for example, a fuel cost per unit liter, and may be a value stored in the controller 50 in advance or a value appropriately received from an external information terminal or the like.

After calculating the stop and start energy cost in S104 in FIG. 4, in S105, the controller 50 calculates an energy cost (hereinafter, referred to as an "electricity generation continuation energy cost") when electricity generation is continued as it is in the fuel cell stack 1 until a next vehicle operation start timing. The electricity generation continuation energy cost calculated in S105 is an energy cost (second energy cost) required when the electricity generation is continued in a state in which the temperature of the fuel cell stack 1 can be maintained at the warm-up temperature from the current time point (cost calculation timing) to the next vehicle operation start timing. This electricity generation continuation energy cost is calculated, for example, as shown in FIG. 6.

Figure 6:
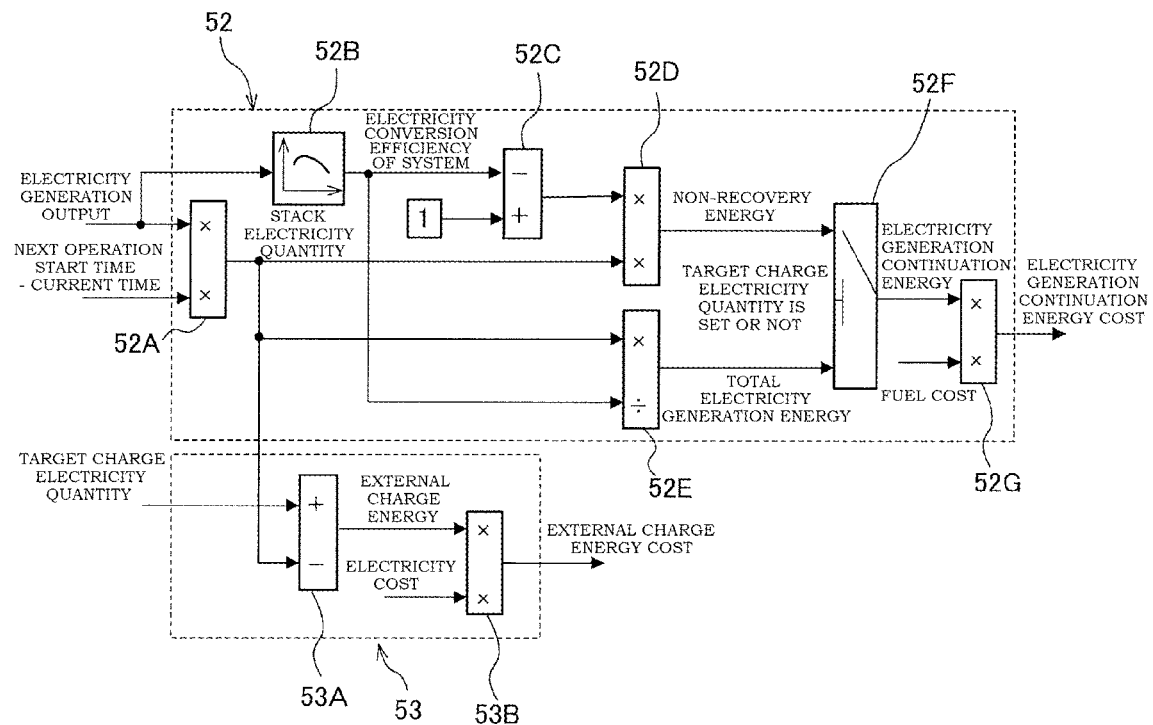
FIG. 6 is a diagram illustrating an electricity generation continuation energy cost calculation unit and an external charge energy cost calculation unit of the controller.

FIG. 6 is a diagram illustrating an electricity generation continuation energy cost calculation unit 52 and an external charge energy cost calculation unit 53 of the controller 50.

As shown in FIG. 6, the electricity generation continuation energy cost calculation unit 52 includes an electricity quantity calculation unit 52A, a system efficiency calculation unit 52B, a subtraction unit 52C, a non-recovery energy calculation unit 52D, an electricity generation energy calculation unit 52E, a selection unit 52F, and a cost calculation unit 52G.

The electricity quantity calculation unit 52A calculates a stack electricity quantity by multiplying an electricity generation output of the fuel cell stack 1 by a duration (duration time), which is a difference between a next operation time (next vehicle operation start timing) and a current time (current cost calculation timing). During the continuation of electricity generation, the fuel cell stack 1 generates electricity in a state where the stack temperature is maintained at the warm-up temperature, so that the electricity generation output is stored in the ROM or the like of the controller 50 as a predetermined value set in advance. The electricity generation output is calculated based on an output current and an output voltage at the current time, and an electricity generation output value calculated in this way may be used as the electricity generation output used in the electricity quantity calculation unit 52A.

The system efficiency calculation unit 52B refers to a system efficiency table, and calculates, based on the electricity generation output, electricity conversion efficiency of the entire system in consideration of the electricity loss or the like in various components of the fuel cell system 100. The electricity conversion efficiency is a value of 0 or more and 1 or less.

The subtraction unit 52C calculates a value obtained by subtracting the electricity conversion efficiency from 1, and the non-recovery energy calculation unit 52D calculates a non-recovery energy by multiplying the value calculated by the subtraction unit 52C and the stack electricity quantity. This non-recovery energy is an energy (fuel quantity or the like) that is not recovered as electricity, among the energy consumed during the continuation of electricity generation.

The electricity generation energy calculation unit 52E calculates, by dividing the stack electricity quantity by the electricity conversion efficiency of the entire system, a total electricity generation energy (fuel quantity or the like) required to generate the stack electricity quantity by using the fuel cell stack 1.

The selection unit 52F outputs one of the non-recovery energy and the total electricity generation energy as the electricity generation continuation energy depending on whether a target charge electricity quantity for the battery 5 is set. In the fuel cell system 100, a minimum battery charge quantity when the system is stopped is set, and a target charge electricity quantity is set so as to satisfy this minimum battery charge quantity. The target charge electricity quantity may be set such that a charge quantity of the battery 5 is an allowable upper limit charge quantity. The fuel cell system 100 may be configured to notify the driver or the like of charging the battery 5 by the external charger 80 when the target charge electricity quantity is set. Therefore, the selection unit 52F may determine that the target charge electricity quantity is set when the fuel cell system 100 is connected to the external charger 80. The selection unit 52F outputs the non-recovery energy as the electricity generation continuation energy when the target charge electricity quantity is not set, and outputs the total electricity generation energy as the electricity generation continuation energy when the target charge electricity quantity is set.

The cost calculation unit 52G calculates the electricity generation continuation energy cost by integrating a cost per unit energy with respect to the electricity generation continuation energy (fuel quantity or the like). The cost per unit energy is, for example, a fuel cost per unit liter, and may be a value stored in the controller 50 in advance or a value appropriately received from an external information terminal or the like.

After calculating the stop and start energy cost and the electricity generation continuation energy cost in steps S104 and S105 in FIG. 4, the controller 50 executes processing of S106. In S106, the controller 50 compares the electricity generation continuation energy cost required in a case where electricity generation is continued as it is until the next vehicle operation start timing with the stop and start energy cost required in a case where the warm-up control is performed until the vehicle operation starts after the stop control is performed from the current time.

When the stop and start energy cost is larger than the electricity generation continuation energy cost, the controller 50 determines that the energy loss is smaller when electricity generation in the fuel cell stack 1 is continued, and executes processing of step S107. On the other hand, when the stop and start energy cost is equal to or less than the electricity generation continuation energy cost, the controller 50 determines that the energy loss is smaller when the stop control is started at this stage, and executes processing of step S108.

In step S107, the controller 50 continues to supply the anode gas and the cathode gas to the fuel cell stack 1, and continues to generate electricity in the fuel cell stack 1 in an electricity generation state in which the temperature of the fuel cell stack 1 is maintained at the warm-up temperature. After executing the processing of step S107, the controller 50 executes the processing of step S103.

In step S108, the controller 50 ends the electricity generation of the fuel cell stack 1, and starts the stop control. In this stop control, the temperature of the fuel cell stack 1 is decreased to a predetermined temperature by mainly supplying the cathode gas to the fuel cell stack 1, and the operation of the fuel cell system 100 is ended. In the fuel cell system 100 whose operation is stopped in this way, the operation is stopped until the restart timing of the fuel cell stack 1, and the warm-up control is started at the restart timing.

On the other hand, when the target charge electricity quantity of the battery 5 is set by connecting the external charger 80 or the like, the controler 50 calculates a stop and start energy cost in step S109, and calculates an electricity generation continuation energy cost in step S110. The calculation of the stop and start energy cost in step S109 is the same as the calculation of the stop and start energy cost in step S104, and the calculation of the electricity generation continuation energy cost in step S110 is the same as the calculation of the electricity generation continuation energy cost in step S105.

After the processing of step S110, in step S111, the controller 50 calculates an energy cost (hereinafter, referred to as an "external charge energy cost") required when the battery 5 is charged to the target charge quantity from the current time by the external charger 80. The external charge energy cost calculated in step S111 is an energy cost (third energy cost) required when the battery 5 is charged by the external charger 80 from the current cost calculation timing to when the target charge quantity is reached. This external charge energy cost is calculated, for example, as shown in FIG. 6.

As shown in FIG. 6, the external charge energy cost calculation unit 53 includes an external charge energy calculation unit 53A and a cost calculation unit 53B.

The external charge energy calculation unit 53A calculates an external charge energy (electricity quantity or the like) by subtracting the stack electricity quantity (electricity quantity charged from the fuel cell stack 1 to the battery 5) calculated by the electricity generation continuation energy cost calculation unit 52 from the target charge quantity required for charging to the target charge electricity quantity. When the battery charge quantity is less than a minimum charge quantity predetermined considering the electricity required at the time of starting the system, the target charge electricity quantity is calculated based on a difference between the minimum charge quantity (target charge quantity) and a current battery charge quantity. The controller 50 calculates the current battery charge quantity based on a detected value of the voltage sensor 50D or the like.

The cost calculation unit 53B calculates the external charge energy cost by integrating an electricity cost per unit energy with respect to the external charge energy (electricity quantity or the like). The electricity cost per unit energy is, for example, an electricity charge per unit electricity quantity, and may be a value stored in the controller 50 in advance or a value appropriately received from an external information terminal or the like.

After calculating the stop and start energy cost, the electricity generation continuation energy cost, and the external charge energy cost in steps S109 to S111 in FIG. 4, the controller 50 executes processing of step S112. In step S112, the controller 50 compares the electricity generation continuation energy cost with a sum of the stop and start energy cost and the external charge energy cost.

When the sum of the stop and start energy cost and the external charge energy cost is larger than the electricity generation continuation energy cost, the controller 50 determines that the energy loss is smaller when the electricity generation of the fuel cell stack 1 is continued, and executes processing of step S113.

In step S113, the controller 50 continues to supply the anode gas and the cathode gas to the fuel cell stack 1, and continues to generate electricity in the fuel cell stack 1 in an electricity generation state in which the temperature of the fuel cell stack 1 is maintained at the warm-up temperature. At this time, the battery charging by the external charger 80 is also continued. After executing the processing of step S113, the controller 50 executes the processing of step S103.

On the other hand, when it is determined in step S112 that the sum of the stop and start energy cost and the external charge energy cost is equal to or less than the electricity generation continuation energy cost, the controller 50 determines that the energy loss is smaller when the system stop control is executed at this stage, and executes the processing of step S108. In S108, the controller 50 ends the electricity generation of the fuel cell stack 1, and starts the system stop control. Although the electricity generation of the fuel cell stack 1 is stopped by the system stop control, the battery charging by the external charger 80 is continued.

According to the fuel cell system 100 in the present embodiment, the following effects can be obtained.

The fuel cell system 100 includes the fuel cell stack 1, and the catalyst combustor 40 for warming up the fuel cell stack 1, and is configured to execute the stop control when the system operation stop request from the driver or the like is received. The controller 50 of the fuel cell system 100 acquires the operation stop request of the fuel cell system 100, acquires the next vehicle operation start timing, and calculates the stop and start energy cost and the electricity generation continuation energy cost at a predetermined timing (current cost calculation timing) after acquiring the operation stop request and the next operation start timing. The stop and start energy cost is an energy cost required from the predetermined timing to the completion of warming up of the fuel cell stack 1 when the warm-up control is executed using the catalyst combustor 40 in accordance with the next vehicle operation start timing after the stop control is executed. The electricity generation continuation energy cost is an energy cost required when the operation of the fuel cell stack 1 is continued so as to maintain the temperature of the fuel cell stack 1 at the warm-up temperature from the predetermined timing to the next vehicle operation start timing. After acquiring the operation stop request, the controller 50 continues operation of the fuel cell stack 1 so as to maintain the temperature of the fuel cell stack 1 at the warm-up temperature while the stop and start energy cost is larger than the electricity generation continuation energy cost.

In this way, the fuel cell system 100 continues the operation of the fuel cell stack 1 while the stop and start energy cost is larger than the electricity generation continuation energy cost after the system stop request is acquired, and therefore, the energy loss after the system stop request can be prevented. In this way, it is possible to realize the control of the fuel cell system 100, which can reduced the energy costs in consideration of the energy cost from the system stop to the next vehicle operation start and the energy cost associated with the electricity generation of the fuel cell when the system stop request is received.

Further, after acquiring the operation stop request, the controller 50 starts the stop control when the stop and start energy cost is equal to or less than the electricity generation continuation energy cost. In this way, by executing the stop control when the stop and start energy cost is equal to or less than the electricity generation continuation energy cost, the energy loss after the system stop request can be prevented.

Further, the controller 50 calculates, based on the stop time from the predetermined timing (cost calculation timing) to the restart timing (warm-up start timing) of the fuel cell stack 1 and the stack temperature at the predetermined timing, the pre-start stack temperature after executing the stop control, and calculates the stop and start energy cost based on the calculated pre-start stack temperature. In this way, by using the pre-start stack temperature, the energy costs related to the stop control and the warm-up control can be accurately calculated.

Further, the controller 50 of the fuel cell system 100 calculates the stack electricity quantity based on a duration (duration time) from the predetermined timing (cost calculation timing) to the next vehicle operation start timing and the electricity generation output of the fuel cell stack 1, and calculates the electricity generation continuation energy cost based on the calculated stack electricity quantity and the electricity conversion efficiency of the fuel cell system 100. In this way, by using the stack electricity quantity that can be generated by the fuel cell stack 1 and the electricity conversion efficiency determined in consideration of the entire system, the energy costs can be accurately calculated when the electricity generation is continued in the fuel cell stack 1.

Further, the fuel cell system 100 further includes the battery 5 as the vehicle power supply, and the charging connector 75 that can be connected to the charging unit 81 of the external charger 80, and the battery 5 is configured to be charged by at least one of the fuel cell stack 1 and the external charger 80. The controller 50 calculates the external charge energy cost required to charge the battery 5 to the target charge quantity by the external charger 80, when the fuel cell system 100 is connected to the external charger 80. After acquiring the operation stop request, the controller 50 continues the operation of the fuel cell stack 1 so as to maintain the temperature of the fuel cell stack 1 at the warm-up temperature while the sum of the stop and start energy cost and the external charge energy cost is larger than the electricity generation continuation energy cost, and starts the stop control when the sum of the stop and start energy cost and the external charge energy cost is equal to or less than the electricity generation continuation energy cost.

In the fuel cell system 100, when the battery is charged by the external charger 80, it is possible to determine whether to continue the operation of the fuel cell stack 1 or to execute the stop control in consideration of not only the stop and start energy cost and the electricity generation continuation energy cost but also the external charge energy cost. As a result, even when the fuel cell system 100 is connected to the external charger 80, the energy loss after the system stop request can be prevented.

The controller 50 of the fuel cell system 100 calculates the stack electricity quantity based on the duration from the predetermined timing (cost calculation timing) to the next vehicle operation start timing and the electricity generation output of the fuel cell stack 1, and calculates the external charge energy cost based on the target charge electricity quantity of the battery 5 and the stack electricity quantity. In this way, by using the target charge electricity quantity of the battery 5 and the stack electricity quantity, the energy costs when the battery 5 is charged by the external charger 80 can be accurately calculated.

Second Embodiment

Figure 8:
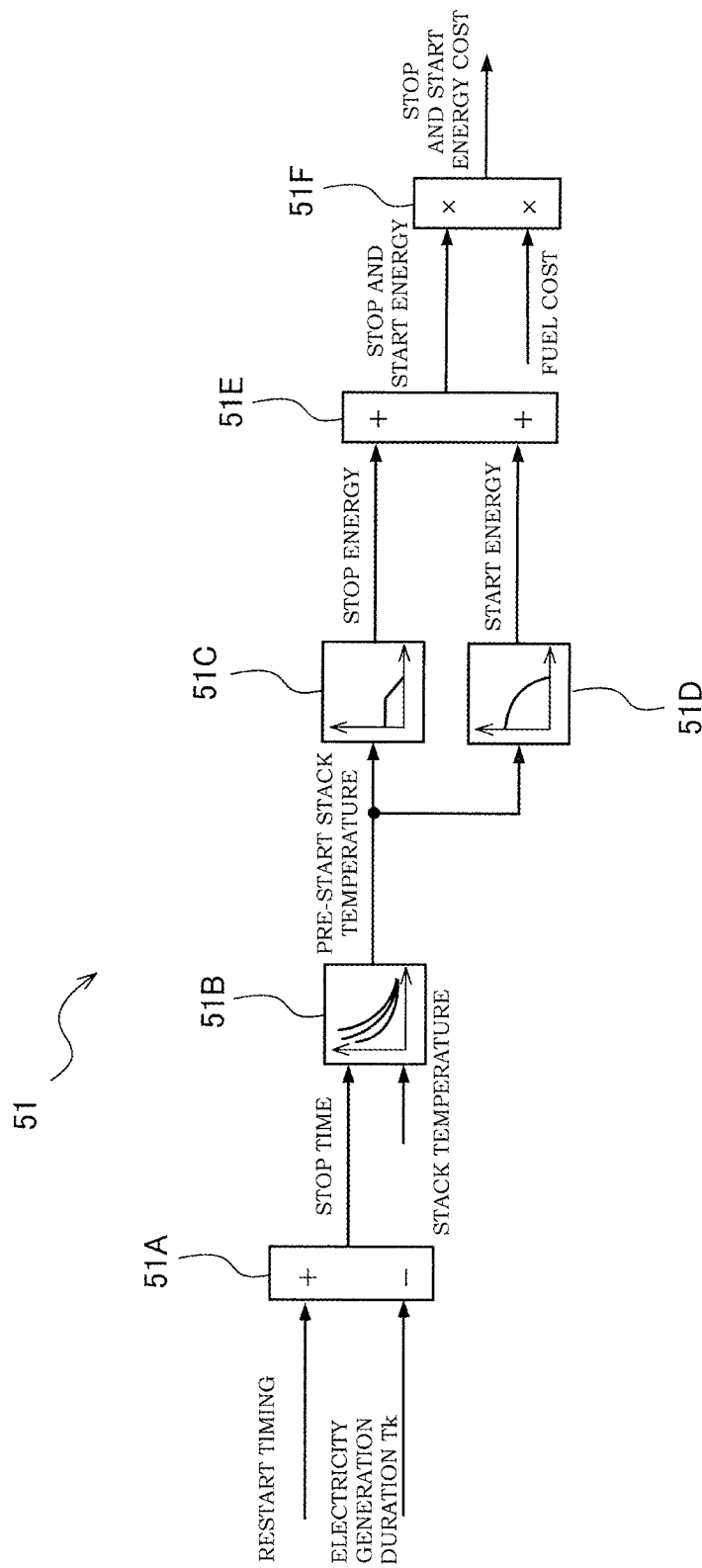
FIG. 8 is a diagram illustrating a stop and start energy cost calculation unit of a controller.
Figure 9:
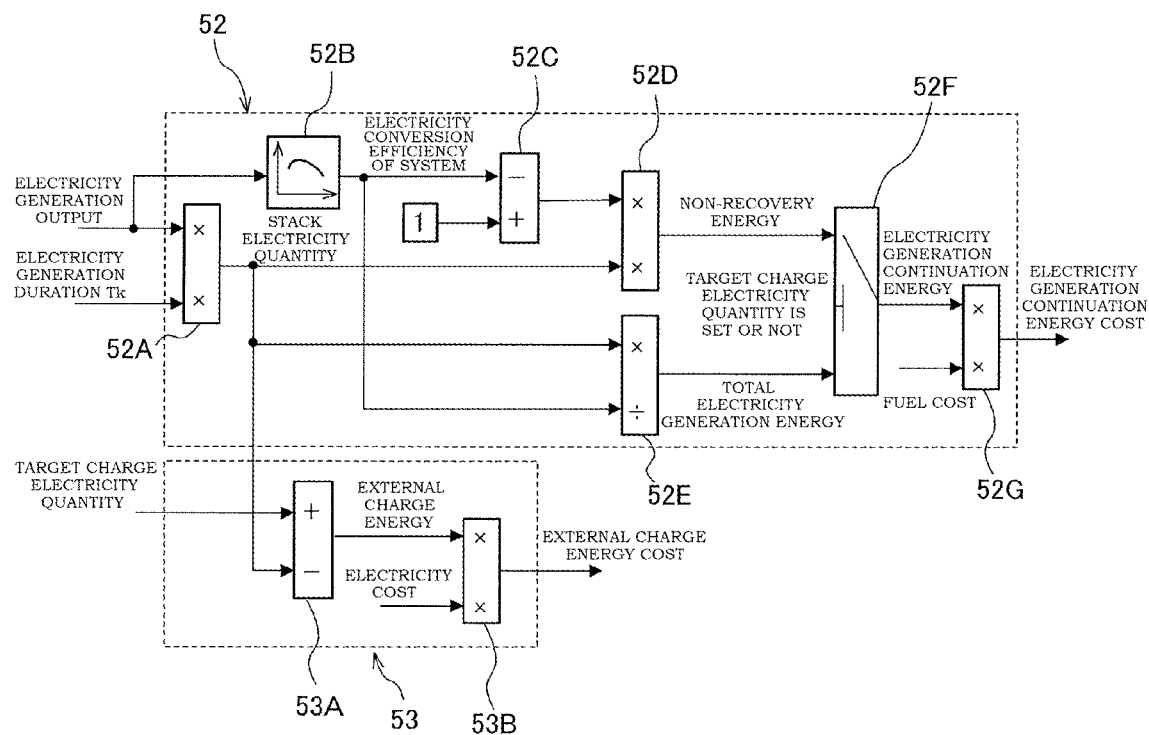
FIG. 9 is a diagram illustrating an electricity generation continuation energy cost calculation unit and an external charge energy cost calculation unit of the controller.

Next, the fuel cell system 100 according to a second embodiment of the present invention is described with reference to FIGS. 7 to 9. In the following embodiment, the same reference numerals are used for configurations and the like that perform the same functions as those in the first embodiment, and duplicate descriptions are omitted as appropriate.

The fuel cell system 100 according to the second embodiment is configured to set the electricity generation duration of the fuel cell stack 1 such that the energy loss after the system stop request is minimized when the system is connected to the external charger 80 or the like.

Processing executed by the fuel cell system 100 according to the second embodiment when a system stop request is detected is described with reference to FIG. 7. FIG. 7 is a flowchart illustrating a flow of the processing executed when the system stop request is issued. Since the processing other than that of steps S201 to S208 in FIG. 7 is the same as the processing described in FIG. 4, the processing of steps S201 to S208 is described here.

Figure 7:
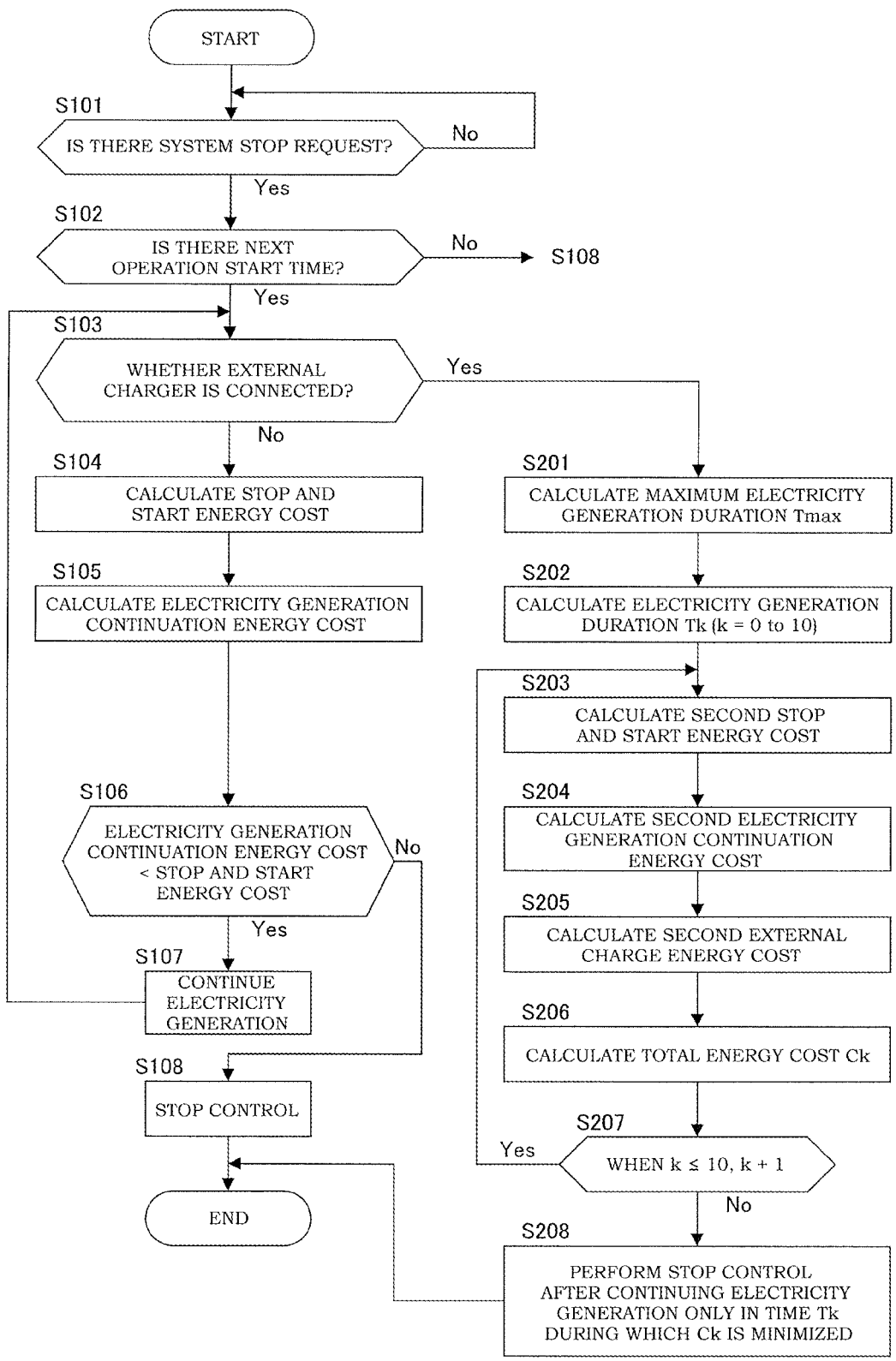
FIG. 7 is a flowchart illustrating a flow of processing executed when a system stop request is issued in a fuel cell system according to a second embodiment.

In step S103 of FIG. 7, when the external charger 80 is connected and a target electricity quantity of the battery 5 is set, the controller 50 executes the processing of step S201.

In step S201, the controller 50 calculates a maximum electricity generation duration $T_{MAX}$ as a maximum value of a time during which the electricity generation of the fuel cell stack 1 can be continued, for example, by subtracting a time (stop request acquisition timing) when the stop request is acquired from a restart timing of the fuel cell stack 1 that is obtained based on a next operation start time.

In step S202, the controller 50 determines an electricity generation duration Tk (for example, k=0 to 10) obtained by dividing the maximum electricity generation duration $T_{MAX}$ by a predetermined number of times k. The electricity generation duration Tk indicates an elapsed time from the stop request acquisition timing, and for example, when the maximum electricity generation duration $T_{MAX}$ is 10 minutes, values of electricity generation durations are $T_0=0$ minutes, $T_1=1$ minute, $T_2=2$ minutes, . . . , $T_{10}=10$ minutes.

In step S203, the controller 50 calculates an energy cost (second stop and start energy cost) required when the stop and start control is executed after electricity is generated only in the electricity generation duration Tk from the stop request acquisition timing. As shown in FIG. 8, the controller 50 (stop and start energy cost calculation unit 51) calculates a stop time based on the restart timing and the electricity generation duration Tk, and calculates the second stop and start energy cost (fourth energy cost) by inputting this stop time into the pre-start stack temperature calculation unit 51B. The second stop and start energy cost is an energy cost required from the stop request timing to the completion of warming up of the fuel cell when the stop control is executed after the set electricity generation duration is elapsed, and the warm-up control is executed using the heater according to the next vehicle operation start timing. Unlike the first embodiment, the electricity generation duration Tk calculated in step S202 is input to the stop time calculation unit 51A in FIG. 8 instead of an actual cost calculation timing (current time).

After calculating the second stop and start energy cost in step S203, in step S204, the controller 50 calculates an energy cost (second electricity generation continuation energy cost) required when electricity is generated only in the electricity generation duration Tk from the stop request acquisition timing. As shown in FIG. 9, the controller 50 (electricity generation continuation energy cost calculation unit 52) calculates a stack electricity quantity in the electricity generation duration based on the electricity generation output of the fuel cell stack 1 and the electricity generation duration Tk, and calculates the second electricity generation continuation energy cost (fifth energy cost) by inputting this stack electricity quantity to the electricity generation energy calculation unit 52E. Unlike the first embodiment, the electricity generation duration Tk calculated in step S202 is input to the electricity quantity calculation unit 52A in FIG. 9 instead of a stop time.

After calculating the second electricity generation continuation energy cost in step S204, in step S205, the controller 50 calculates an energy cost (second external charge energy cost) required when the battery 5 is charged to the target charge quantity by the external charger 80. As shown in FIG. 9, the controller 50 (external charge energy cost calculation unit 53) calculates the second external charge energy cost (sixth energy cost) based on the target charge electricity quantity, and the stack electricity quantity calculated based on the electricity generation output and the electricity generation duration Tk.

After calculating the external charge energy cost as described above, in step S206 of FIG. 7, the controller 50 calculates a total energy cost Ck by adding the stop and start energy cost, the electricity generation continuation energy cost, and the external charge energy cost in the electricity generation duration Tk. This total energy cost Ck is temporarily stored in a storage medium such as the RAM of the controller 50.

In step S207, the controller 50 determines whether the total energy costs $C_0$ to $C_{10}$ are calculated for all the electricity generation durations $T_0$ to $T_{10}$, and counts up a variable k and repeats processing of step S203 and subsequent steps when not all the calculations are completed. When the total energy costs $C_0$ to $C_{10}$ are calculated for all the electricity generation durations $T_0$ to $T_{10}$, the controller 50 executes processing of step S208.

In step S208, the controller 50 selects an electricity generation duration with a smallest total energy cost among the total energy costs $C_0$ to $C_{10}$ in the electricity generation durations $T_0$ to $T_{10}$, and continues the operation (electricity generation) of the fuel cell stack 1 in an electricity generation state in which the temperature of the fuel cell stack 1 is maintained at the warm-up temperature until the selected electricity generation duration elapses from the stop request acquisition timing. At a timing when the electricity generation duration elapses, the controller 50 ends the electricity generation of the fuel cell stack 1, and starts the stop control.

Figure 10:
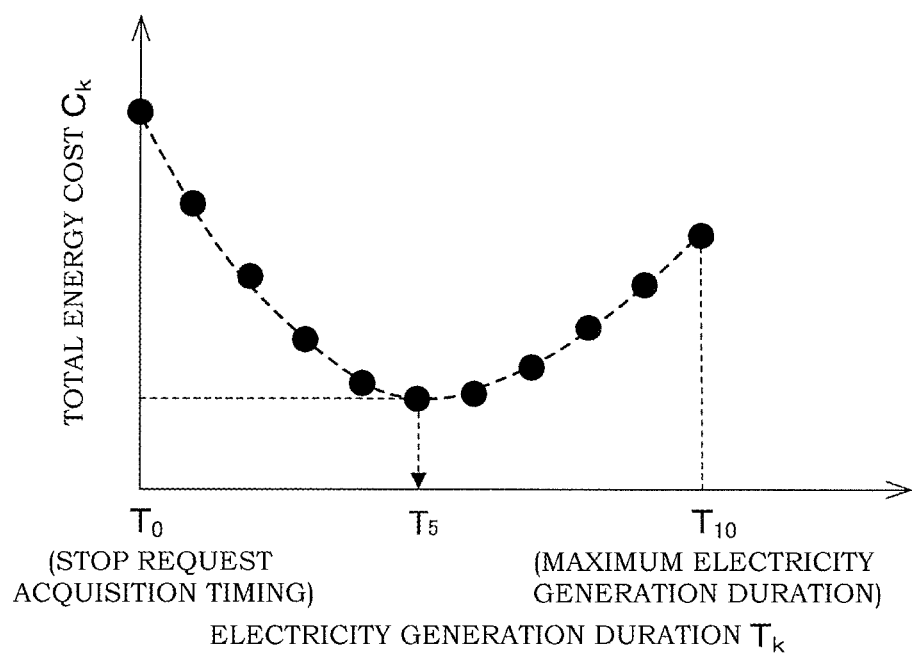
FIG. 10 is a diagram illustrating a method for selecting an electricity generation duration in the fuel cell system according to the second embodiment.

According to the fuel cell system 100 in the present embodiment described above, as shown in FIG. 10, when a system stop request is issued by the driver or the like, a sum (total energy cost) of the second stop and start energy cost, the second electricity generation continuation energy cost, and the second external charge energy cost is calculated for each of the electricity generation durations $T_0$ to $T_{10}$ obtained by dividing the maximum electricity generation duration. The controller 50 selects the electricity generation duration with the smallest total energy cost among the total energy costs in the electricity generation durations $T_0$ to $T_{10}$. For example, as shown in FIG. 10, when a total energy cost in an electricity generation duration $T_5$ is the smallest, the operation (electricity generation) of the fuel cell stack 1 is continued from the stop request acquisition timing until the electricity generation duration $T_5$ elapses, and then the stop control is executed. Since the fuel cell system 100 has a configuration in which the operation (electricity generation) of the fuel cell stack 1 is continued only in the electricity generation duration which minimizes the total energy cost, the energy loss after the system stop request can be prevented more reliably.

In the second embodiment, the controller 50 selects an electricity generation duration $T_k$ with the smallest energy cost as the electricity generation duration, but a method for selecting the electricity generation duration is not limited thereto. For example, in the electricity generation duration $T_k$, two times including a time with a lowest energy cost and a time with a next lowest energy cost, are extracted, and an average time is calculated from these two times. Then, a total energy cost in this average time is calculated, and a total energy cost in the average time is compared with a minimum total energy cost in the electricity generation duration $T_k$, and thereby one with a smaller energy cost may be selected as the electricity generation duration.

As described above, the embodiments of the present invention are described, but the above embodiments merely show a part of application examples of the present invention, and do not intend to limit the technical scope of the present invention to the specific configurations of the above embodiments. Various changes and modifications can be made on the above embodiments within the scope of matters described in claims. Further, the technical idea described in the above first embodiment and second embodiment may be combined as appropriate.

The fuel cell system 100 according to the above embodiments has a configuration in which the fuel cell stack 1 is warmed up by utilizing the combustion heat of the catalyst combustor 40, but may have a configuration in which the fuel cell stack 1 is warmed up by using an electric temperature regulator capable of adjusting the temperature of the fuel cell stack 1 itself. In this way, when the electric temperature regulator is used, the start energy and the like are calculated based on electricity consumed by the regulator.

In the above embodiments, the fuel cell stack 1 is a solid oxide fuel cell, but may be a fuel cell other than the solid oxide fuel cell as long as the fuel cell stack 1 is a fuel cell that executes a predetermined stop control when the system is stopped and a predetermined warm-up control when the system is started.

The invention claimed is:

1. A control method for a fuel cell system for a vehicle including a fuel cell and a heater configured to warm up the fuel cell, the method comprising:
    executing a stop control of the fuel cell system when an operation stop request of the fuel cell system is received;
    determining, after the operation stop request is received, whether a next operation start time of the vehicle has been set;
    calculating a first energy cost and a second energy cost at predetermined intervals, in response to determining that the next operation start time of the vehicle has been set, wherein:
        the first energy cost is an energy cost required in a case where the fuel cell stops operation at a present time and a warm-up of the fuel cell using the heater is performed prior to the next operation start time of the vehicle, and
        the second energy cost is an energy cost required in a case where the fuel cell continues to operate to maintain a temperature of the fuel cell at a warm-up temperature from the present time until the next operation start time of the vehicle; and
    controlling the fuel cell to continue operation to maintain the temperature of the fuel cell at the warm-up temperature as long as the first energy cost is larger than the second energy cost.

2. The control method for a fuel cell system according to claim 1, further comprising:
    starting the stop control when the first energy cost becomes equal to or less than the second energy cost.

3. The control method for a fuel cell system according to claim 1, wherein:
    a pre-start temperature which is a temperature of the fuel cell at a start time of the warm-up of the fuel cell prior to the next operation start time of the vehicle is calculated based on a stop time from the present time until starting of the warm-up of the fuel cell and a temperature of the fuel cell at the present time, and the first energy cost is calculated based on the pre-start temperature.

4. The control method for a fuel cell system according to claim 1, wherein:
    the fuel cell is provided in the form of a fuel cell stack comprising a plurality of unit cells;
    a stack electricity output quantity of the fuel cell stack is calculated by multiplying an electricity generation output of the fuel cell stack and a duration from the present time to the next operation start time of the vehicle, and
    the second energy cost is calculated based on the stack electricity output quantity and electricity conversion efficiency of the fuel cell system.

5. The control method for a fuel cell system according to claim 1, wherein:
    the fuel cell system further includes a battery as a vehicle power supply, and a charging connector configured to be connected to a charging unit of an external charger,
    the battery is configured to be charged by at least one of a fuel cell stack and the external charger, and
    the control method further comprises:
    determining whether the battery is charged by the external charger; and
    in response to determining that the battery is charged by the external charger:
        calculating a third energy cost required when the battery is charged to a target charge quantity by the external charger;
        controlling the fuel cell to continue operation to maintain the temperature of the fuel cell at the warm-up temperature as long as a sum of the first energy cost and the third energy cost is larger than the second energy cost.

6. The control method for a fuel cell system according to claim 5, wherein:
    an electricity output quantity of the fuel cell is calculated by multiplying an electricity generation output of the fuel cell and a duration from the present time to the next operation start time of the vehicle, and
    the third energy cost is calculated based on the target charge quantity of the battery and the electricity output quantity of the fuel cell.

7. The control method for a fuel cell system according to claim 1, wherein:
    the fuel cell is provided in the form of a fuel cell stack comprising a plurality of unit cells;
    the fuel cell system further includes a battery as a vehicle power supply and a charging connector configured to be connected to a charging unit of an external charger,
    the battery is configured to be charged by at least one of the fuel cell stack and the external charger, and
    the method further comprises:
    determining whether the battery is charged by the external charger; and
    in response to determining that the battery is charged by the external charger:
        setting, when the operation stop request is received, a plurality of different electricity generation durations during which electricity generation by the fuel cell stack is performed in a state where the fuel cell system is connected to the external charger;
        sequentially selecting one of the plurality of the different electricity generation durations as a selected electricity generation duration;
        calculating a sum of a fourth energy cost, a fifth energy cost, and a sixth energy cost as a total energy cost for the selected electricity generation duration, wherein:
            the fourth energy cost is an energy cost required when the stop control is started after the selected electricity generation duration is elapsed until the warm-up of the fuel cell stack using the heater is completed prior to the next operation start time of the vehicle,
            the fifth energy cost is an energy cost required by the fuel cell stack to generate electricity during the selected electricity generation duration, and
            the sixth energy cost is an energy cost required when the battery is charged to a target charge quantity by the external charger;
        selecting a smallest energy cost electricity generation duration with which a sum of the fourth energy cost, the fifth energy cost, and the sixth energy cost becomes a smallest value; and continuing the operation of the fuel cell stack such that the temperature of the fuel cell stack is maintained at the warm-up temperature from when the stop request is received until the smallest energy cost electricity generation duration is elapsed, and starting the stop control after the smallest energy cost electricity generation duration is elapsed.

8. A fuel cell system for a vehicle comprising:
a fuel cell;
a heater configured to warm up the fuel cell; and
a controller configured to execute an operation stop control of the fuel cell when an operation stop request of the fuel cell is received, wherein
the controller is further configured to:
   determine, after the operation stop request is received, if a next operation start time of the vehicle has been set;
   calculate a first energy cost and a second energy cost at predetermined intervals if the next operation start time of the vehicle has been set, wherein
     the first energy cost is an energy cost required in a case where the fuel cell stops operation at a present time and a warm-up of the fuel cell using the heater is performed prior to the next operation start time of the vehicle, and
     the second energy cost is an energy cost required in a case where the fuel cell continues to operate to maintain a temperature of the fuel cell at a warm-up temperature from the present time until the next operation start time of the vehicle; and
   control the fuel cell to continue operation to maintain the temperature of the fuel cell at the warm-up temperature as long as the first energy cost is larger than the second energy cost.

* * * * *